Sept. 25, 1956  R. S. METCALF  2,763,929
GLASS CUTTER GAUGE
Filed March 30, 1955

INVENTOR.
RICHARD S. METCALF
BY Ray S Pyle
atty

United States Patent Office 2,763,929
Patented Sept. 25, 1956

2,763,929

GLASS CUTTER GAUGE

Richard S. Metcalf, Ashtabula, Ohio

Application March 30, 1955, Serial No. 497,909

2 Claims. (Cl. 33—42)

This invention relates to new and useful improvements in glass cutters in general, and more particularly to an improved gauge attachment for the cutter which will minimize the time required for cutting and severing a strip from a sheet of glass.

One object of this invention to provide a guide for a conventional glass cutting tool to facilitate the scratching of a breaking line at a predetermined distance parallel to one edge of the glass.

A further object of this invention is to provide a device of the above nature in which the glass cutting gauge may be adjustably clamped in any desired operating position with respect to the cutting tool.

A further object of this invention is to provide a device of the above nature which will be simple in construction, inexpensive to manufacture, easy to install and manipulate, compact, ornamental in appearance, and very efficient and durable in use.

An important object of this invention is to provide an easily attachable gauge which may be secured in position to the stock area of a glass cutter travelling along a straight line while cutting a sheet of glass to a desired width.

Figure 2:
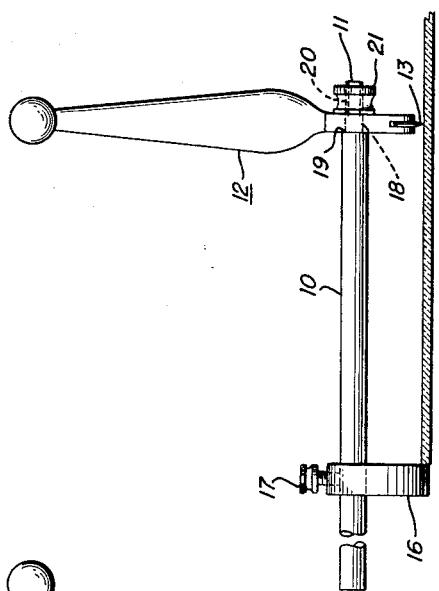
Figure 1:
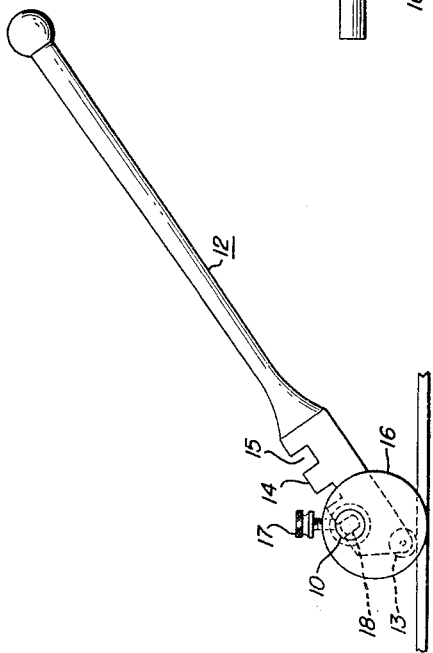

Other objects and a fuller understanding of the invention may be had by referring to the following description and claims, taken in conjunction with the accompanying drawing, in which:

Figure 1 is an end view of the preferred embodiment of the invention as observed from the gauge block end, and showing a glass cutter attached thereto in side elevation; and, Figure 2 is a side view of the gauge attachment device and a front view of the attached cutter.

Referring now to the drawing in detail wherein for the purpose of illustration there is disclosed a preferred embodiment of the invention, the reference character 10 indicates a round gauge bar having a clamp end 11 adapted to clampingly hold a glass cutter 12. A gauge block 16 is carried on the bar 10 and is held in any selected position upon the bar 10 by means of a set screw device 17.

The glass cutter 12 is a conventional hand tool device having a hand grip and a shank or stock portion incorporating a plurality of teeth 14 with flat side walls defining spaces 15 therebetween for the purpose of engaging the edge of a sheet of glass and to sever a scored portion therefrom. Such cutters are provided with hardened cutter wheels, such as wheel 13 illustrated in the drawing.

There have been numerous inventions made for gauging the position of such glass cutter tools. Illustrative of such devices are the Shaw Patent No. 2,603,873 and the Corrado Patent No. 2,629,174. The Shaw patent illustrates the principle of threadably engaging the rod to a tapped hole in the shank portion of the cutter. The Corrado patent illustrates a means for clamping the glass cutter to the gauge rod.

This invention is an improvement upon the principle of providing clamping engagement. The provision of a tapped hole requires special manufacture of the glass cutter 12 to suit the particular gauge device. With clamping arrangements no special source of glass cutters is required. However, prior clamping devices have placed limitations upon the free use of the cutter and, as illustrated by Corrado, require special forms of construction which are both awkward and expensive.

According to this invention the bar 10 is provided with a reduced section 18 adjacent the end 11. It has been found that the preferred form of the reduced section 18 is a rectangular formation to closely fit the shape of the spaces 15 of cutter 12. Such rectangular formation provides the double function of the greatest strength in the reduced section and also prevents relative rotational movement of bar 10 with respect to the cutter, which rotational movement could tend to cause loosening of the clamp action at an inconvenient time.

Provision of the reduced section 18 produces a shoulder 19. The cross sectional dimension of bar 10 is larger than the width of spaces 15, and consequently the shoulder 19 presents an abutment surface against which the sides of the teeth 14 may abut. The end of the bar 10 beyond the reduced section 18 is threaded as indicated in the area of the reference character 20. A conventional screw cap 21 is then threadably engaged upon the threaded end 20 and provides a convenient means for applying clamping pressure upon the teeth 14 to frictionally grip the cutter 12 between the shoulder 19 and the cap 21.

In Figure 1 of the drawing the cutter 12 is illustrated in a position which to some users is considered to be upside down, but to many is the most convenient means of use. This position illustrates the adaptability of the present device without limitation. In devices which employ clamping arrangements as shown by Corrado, the set screw clamp device projects in the plane of the shank portion and therefore permits use of the cutter 12 in only one position. Such limitation has prevented general and wide spread acceptance of such tools just as the requirement of special threaded and tapped attachment openings have done. According to the present invention, the cutter 12 may be quickly attached and detached from the gauge, and therefore is acceptable for its intended purpose. Such cutter devices are seldom used for one particular purpose, and accordingly quick and positive attachment and disengagement are essential.

Further, even though guided, visual observation of the cutter is essential to be certain of proper cutting action. Holding devices in the plane of the cutter wheel therefore are a detriment. With the present invention there is no such obstruction to vision.

Although the invention has been described in its preferred form with a certain degree of particularity, it is understood that the present disclosure of the preferred form has been made only by way of example, and that numerous changes in the details of construction and the combination and arrangement of parts may be resorted to without departing from the spirit and the scope of the invention as hereinafter claimed.

I claim:

1. In combination, a glass cutter including a stock portion incorporating a plurality of teeth with flat side walls defining spaces therebetween, a cutter wheel on one side of said stock portion, a handle grip on the other side of the stock portion, a gauge bar rod, said rod having a cutter attachment end with flat side walls dimensioned to pass through and engage non-rotatively with the flat side walls defining one of said spaces between said cutter teeth, the gauge bar rod beyond said attachment end having a section larger than the spaces between said teeth, a shoulder between the cutter attachment end and the larger section of the rod, the attachment end being threaded, a threaded clamp member on said threaded attachment end, said threaded clamp member and said shoulder serving as a clamp frictionally gripping the stock portion of said glass cutter positioned with a tooth thereof meshed with said attachment end, a gauge block carried by said rod, and means to lock said gauge block a selected distance from said shoulder.

2. A gauge bar and guide device for use with a glass cutter having a shank portion with a plurality of teeth defined by rectangular spaces therebetween, comprising a gauge bar rod having a cutter attachment end, said attachment end having flat side walls defining an elongated cross-sectional form dimensioned to pass through and engage non-rotatively with one of said spaces between said cutter teeth, the gauge bar rod beyond said attachment end having a section larger than the spaces between said teeth, a shoulder between the side walls of the cutter bar end and the larger section of the bar, the attachment end being threaded, a threaded clamp member on said threaded end, said threaded clamp member and said shoulder serving as a clamp to frictionally grip the stock portion of a glass cutter positioned with a tooth thereof meshed with said attachment end, a gauge block carried by said rod, and means to lock said gauge block a selected distance from said shoulder.

References Cited in the file of this patent

UNITED STATES PATENTS

| 1,179,706 | Doerr | Apr. 18, 1916 |
| 1,404,794 | Reitenbaugh | Jan. 31, 1922 |
| 2,603,873 | Shaw | July 22, 1952 |

FOREIGN PATENTS

| 26,258 | Austria | Nov. 10, 1906 |